United States Patent
Matsunaga et al.

(10) Patent No.: US 11,008,019 B2
(45) Date of Patent: May 18, 2021

(54) ALERT APPARATUS OF VEHICLE

(71) Applicant: TOYOTA JIDOSHA KABUSHIKI KAISHA, Toyota (JP)

(72) Inventors: Yasutaka Matsunaga, Nisshin (JP); Toshihiro Takagi, Nisshin (JP); Masumi Fukuman, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/066,042

(22) Filed: Oct. 8, 2020

(65) Prior Publication Data

US 2021/0107505 A1  Apr. 15, 2021

(30) Foreign Application Priority Data

Oct. 11, 2019 (JP) .............................. JP2019-187530

(51) Int. Cl.
| | |
|---|---|
| *G08G 1/16* | (2006.01) |
| *B60W 50/14* | (2020.01) |
| *B60W 30/09* | (2012.01) |
| *B60Q 5/00* | (2006.01) |
| *B62D 15/02* | (2006.01) |

(52) U.S. Cl.
CPC ............. *B60W 50/14* (2013.01); *B60Q 5/006* (2013.01); *B60W 30/09* (2013.01); *B62D 15/021* (2013.01); *B60W 2050/143* (2013.01); *B60W 2050/146* (2013.01)

(58) Field of Classification Search
CPC ................ B60W 50/14; B60W 30/09; B60W 2050/143; B60W 2050/146; B62D 15/021; B60Q 5/006
See application file for complete search history.

(56) References Cited

U.S. PATENT DOCUMENTS

| | | | | | |
|---|---|---|---|---|---|
| 6,133,826 | A * | 10/2000 | Sparling | ................ | B60Q 9/007 340/435 |
| 6,268,803 | B1 * | 7/2001 | Gunderson | ............. | G01S 7/003 340/903 |
| 6,542,085 | B1 * | 4/2003 | Yang | ..................... | G01S 15/931 340/903 |
| 7,487,020 | B2 * | 2/2009 | Iwazaki | ............. | B62D 15/0285 180/204 |
| 7,969,326 | B2 * | 6/2011 | Sakakibara | ............ | G08G 1/168 340/932.2 |
| 8,823,550 | B2 * | 9/2014 | Pampus | ............... | B62D 15/029 340/932.2 |
| 2009/0121899 | A1 * | 5/2009 | Kakinami | .......... | G06K 9/00805 340/932.2 |

(Continued)

FOREIGN PATENT DOCUMENTS

JP  2019-032744 A  2/2019

*Primary Examiner* — Munear T Akki
(74) *Attorney, Agent, or Firm* — Sughrue Mion, PLLC

(57) ABSTRACT

An alert apparatus of a vehicle generates an alert to a driver when an object is a target alert object that is is an object that is present in one of predetermined areas around the vehicle and that has object distance equal to or shorter than a first distance threshold. The alert apparatus sets each one or more of said predetermined areas to a high level alert area based on a current shift range, and set each of the rest of said predetermined areas to a low level alert area.

4 Claims, 10 Drawing Sheets

(56) References Cited

U.S. PATENT DOCUMENTS

| | | | |
|---|---|---|---|
| 2009/0259365 A1* | 10/2009 | Rohlfs | B62D 15/028 |
| | | | 701/41 |
| 2011/0093168 A1* | 4/2011 | Barth | G08G 1/16 |
| | | | 701/41 |
| 2011/0288727 A1* | 11/2011 | Krautter | B62D 15/028 |
| | | | 701/41 |
| 2012/0191337 A1* | 7/2012 | Schoenherr | B62D 15/027 |
| | | | 701/400 |

* cited by examiner

ALERT APPARATUS OF VEHICLE

TECHNICAL FIELD

The present disclosure relates to an alert apparatus of a vehicle configured to generate an alert/warning.

BACKGROUND

There has been a known alert apparatus of a vehicle configured to generate an alert when a positional relationship satisfies an alert condition. One of the alert apparatuses of this type (hereinafter, referred to as a "conventional apparatus") is disclosed in, for example, Japanese Patent Application Laid-Open (kokai) No. 2019-32744. Hereinafter, a distance between a vehicle having the alert apparatus and an object is sometimes referred to as an "object distance".

While the vehicle is moving forward, the conventional apparatus:

generates an alert/warning sound having an intermittent sound pattern (discontinuous alert sound), when the object distance is shorter than a sound outputting distance threshold and is longer than a continuous sound starting distance threshold; and generates an alert/warning sound having a continuous sound pattern (continuous alert sound) when the object distance is shorter than the continuous sound starting distance threshold.

SUMMARY

When the vehicle is moving backward, it is also preferable that the alert sound be generated based on a distance between the vehicle and an object that is present behind the vehicle. In other words, an alert sound should be generated based on the object that is present in an area in front of (ahead of) the vehicle when the vehicle is moving forward (i.e., when a shift position is at a forward/drive range), whereas, an alert sound should be generated based on the object that is present in an area behind the vehicle when the vehicle is moving backward (i.e., when the shift position is at a reverse/backward range). An apparatus for realizing the above function may be configured to set an alert area to a front/forward area when the shift position is at the forward range, and to set the alert area to a rear/backward area when the shift position is at the reverse range, wherein the alert area is an area which the apparatus to monitor to generate the alert sound.

According to the thus configured apparatus, the alert area is switched from the rear area to the front area, when the shift position is switched from the reverse range to the forward range. This may suddenly stop generating the alert sound immediately after the shift position is switched from the reverse range to the forward range, if the alert has been generated with respect to an object present in the rear area and no object is present in the front area. The sudden stop of the alert sound may cause the driver to feel the feeling of strangeness (odd feeling).

The present disclosure is made to cope with the problem described above. One of objectives of the present disclosure is to provide an alert apparatus of a vehicle that is capable of decreasing a possibility of causing the driver to feel the feeling of strangeness due to the sudden stop of the alert.

An alert apparatus of a vehicle (hereinafter, referred sometimes to as a "present disclosed apparatus") comprises:

an object detection sensor (30, 301-308) configured to detect an object to obtain information on a position of the object, the information including an object distance that is a distance of the object from the vehicle;

a shift range detection sensor (27) configured to detect a current shift range; and a control unit (90, 50, 60) configured to generate an alert to a driver of the vehicle when it is determined that, based on said obtained information by said object detection sensor, the object detected by the object detection sensor is a target alert object that is an object that is present in one of predetermined areas around the vehicle and that has the object distance equal to or shorter than a first distance threshold.

The control unit is configured to:

set each one or more of the predetermined areas to a high level alert area based on the detected current shift range, and set each of the rest of the predetermined areas to a low level alert area (step 815, step 835, step 845);

determine whether or not the object distance of the target alert object is equal to or shorter than a second distance threshold that is shorter than the first distance threshold (step 920), when the target alert object is positioned in the high level alert area (step 915: Yes);

generate a high level alert having a first alerting capability of drawing the driver's attention (step 925, step 935), when it is determined that the object distance of the target alert object positioned in the high level alert area is equal to or shorter than the second distance threshold (step 920: Yes);

generate a low level alert having a second alerting capability of drawing the drivers attention (step 940), the second alerting capability being lower than the first alerting capability, when it is determined that the object distance of the target alert object positioned in the high level alert area is longer than the second distance threshold (step 920: No); and generate the low level alert (step 940), when the target alert object is positioned in the low level alert area (step 915: No), regardless of whether or not the object distance of the target alert object positioned in the low level alert area is equal to or shorter than the second distance threshold.

According to the present disclosed alert apparatus, among a plurality of the predetermined areas (sections, regions), each one or more of the areas that corresponds to (or that has been determined in advance according to) the shift range is set to (or is treated as) the high level alert area, and the rest of them is set to (or is treated as) the low level alert area. Therefore, if the one of the alerts (i.e., the high level alert or the low level alert) has been generated before the shift range is changed/switched, that alert does not suddenly disappear (or is not suddenly stopped) at the timing of the shift range change (since at least the low level alert continues to be or is started to be generated). Accordingly, a possibility of causing the driver to feel the feeling of strangeness due to the sudden stop of the alert can be decreased.

In some embodiments, the predetermined areas include a front center area (FC) of the vehicle and a rear area (R) of the vehicle. The front center area is an specified/sectioned area that is present in front of the vehicle. The rear area is an specified/sectioned area that is present behind the vehicle.

In this embodiment, the control unit is configured to:

set the front center area to the high level alert area (step 835) and set the rear area to the low level alert area (step 840), when the current shift range is a forward range (step 830: Yes); and set the rear area to the high level alert area (step 815) and set the front center area to the low level alert area (step 820), when the current shift range is a reverse range (step 810: Yes).

This embodiment can set an "area which the driver should pay attention to (watch out for) because an object present in the area has a relatively high possibility of colliding with the vehicle" to the high level alert area, and set an "area which is less likely to include an object that may collide with the vehicle" to the low level alert area. Therefore, the high level alert can certainly be generated with respect to the object that is present in the high alert area and that thus has a high possibility of colliding with the vehicle, when it is preferable that the high level alert be generated. Whereas, the high level alert is not generated with respect to the object that is present in the low alert area and that thus has a low possibility of colliding with the vehicle. Accordingly, since the high level alert is not generated for the object that has a low possibility of colliding with the vehicle, a possibility of causing the driver to feel bothered by the alert can be decreased.

In some embodiments, the predetermined areas further include, in addition to the front center area and the rear area, a front left area (FL) that is an area on the left of the front center area and a front right area (FR) that is an area on the right of the front center area, and the control unit is configured to:

set not only the front center area but also each of the front left area and the front right area to the high level alert area (step 835) and set the rear area to the low level alert area (step 840), when the current shift range is the forward range (step 830: Yes); and set not only the rear area but also each of the front left area and the front right area to the high level alert area (step 815) and set the front center area to the low level alert area (step 820), when the current shift range is the reverse range (step 810: Yes).

When the vehicle moves forward, an object that is present in the front left area or the front right area has a high possibility of colliding with the vehicle. Therefore, each of the front left area or the front right area is set to the high alert level area, when the vehicle moves forward. In addition, when the vehicle moves backward (especially, when the vehicle moves backward while turning), an object that is present in the front left area or the front right area also has a high possibility of colliding with the vehicle. Therefore, each of the front left area and the front right area is also set to the high alert level area, when the vehicle moves backward. Consequently, this embodiment can set an "area which the driver should pay attention to (watch out for)" to the high level alert area (regardless of the moving direction of the vehicle).

In some embodiments, the alert apparatus further comprises a steering angle sensor configured to detect a steering angle of the vehicle. The predetermined areas further include, in addition to the front center area and the rear area, a front left area (FL) that is an area on the left of the front center area and a front right area (FR) that is an area on the right of the front center area.

The control unit is configured to:

set not only the front center area but also each of the front left area and the front right area to the high level alert area (step 835) and set the rear area to the low level alert area (step 840), when the current shift range is the forward range (step 830: Yes);

set not only the rear area but also the front right area to the high level alert area (step 1010) and set not only the front center area but also the front left area to the low level alert area (step 1015), when the current shift range is the reverse range (step 810: Yes) and the detected steering angle indicates that a steering wheel has been rotated counterclockwise with respect to a neutral position of the steering wheel (step 1005: Yes); and set not only the rear area but also the front left area to the high level alert area (step 1025) and set not only the front center area but also the front right area to the low level alert area (step 1030), when the current shift range is the reverse range (step 810: Yes) and the detected steering angle indicates that the steering wheel has been rotated clockwise with respect to the neutral position of the steering wheel (step 1020: Yes).

When the steering wheel is rotated counterclockwise from the neutral position while the shift position is at the reverse range, the vehicle VA moves backward in such a manner that a curve trajectory (a substantial radius of the trajectory) of the front right corner of the vehicle VA becomes larger than that of the front left corner of the vehicle VA. Therefore, in this case, since the front right corner of the vehicle VA has a relatively high possibility of colliding/contacting with an object, the front right area is set to the high level alert area. Whereas, in this case, since the front left corner of the vehicle VA has a relatively low possibility of colliding/contacting with an object, the front left area is set to the low level alert area.

Similarly, when the steering wheel is rotated clockwise from the neutral position while the shift position is at the reverse range, the vehicle VA moves backward in such a manner that a curve trajectory (a substantial radius of the trajectory) of the front left corner of the vehicle VA becomes larger than that of the front right corner of the vehicle VA. Therefore, in this case, since the front left corner of the vehicle VA has a relatively high possibility of colliding/contacting with an object, the front left area is set to the high level alert area. Whereas, in this case, since the front right corner of the vehicle VA has a relatively low possibility of colliding/contacting with an object, the front right area is set to the low level alert area.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols. Other objects, other features, and attendant advantages of the present disclosure will be readily appreciated from the following description of the embodiments of the disclosure which is made with reference to the accompanying drawings.

DETAILED DESCRIPTION

Figure 1:
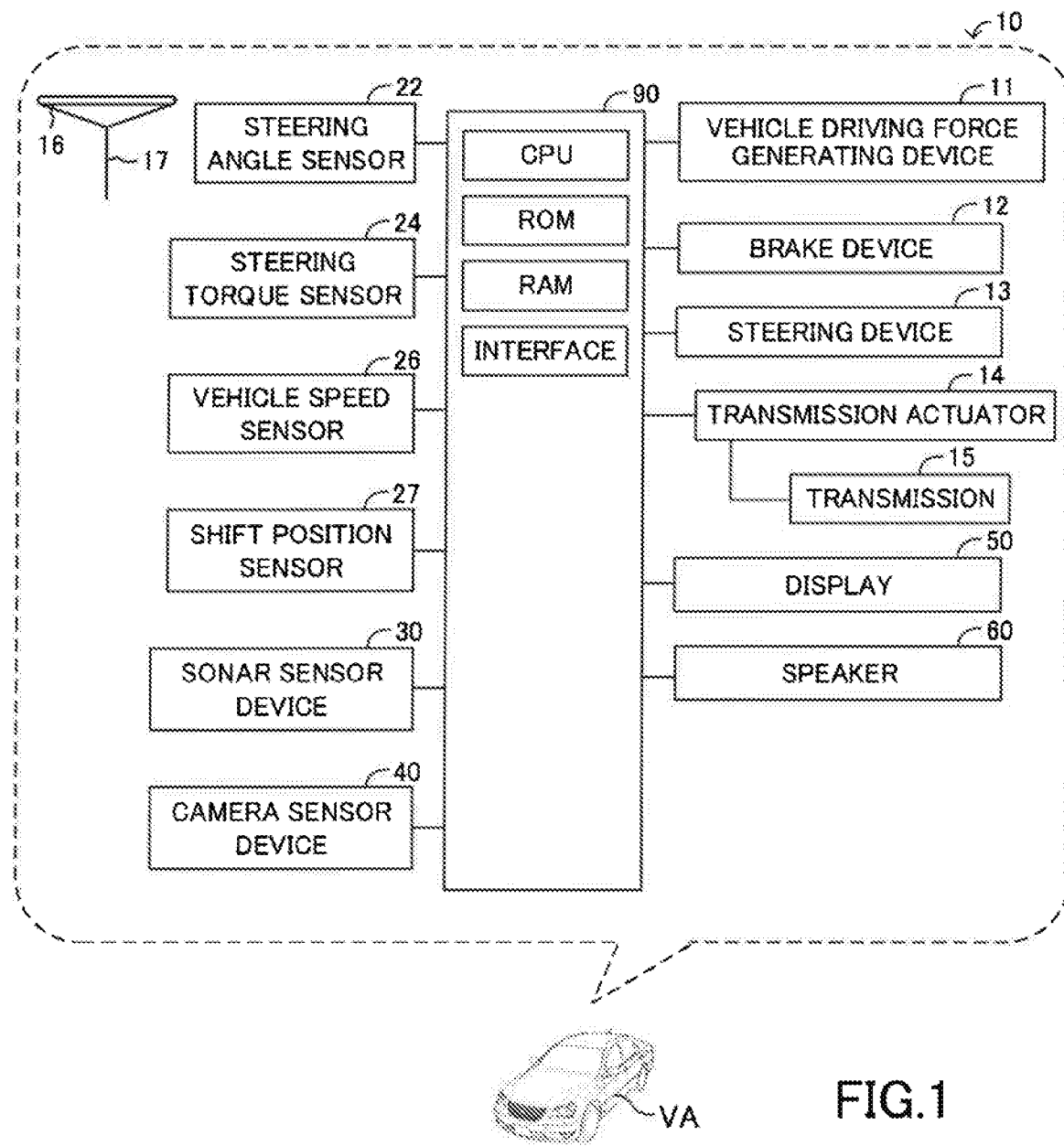
FIG. 1 is a schematic diagram of an alert apparatus of a vehicle according to an embodiment of the present disclosure.

An "alert/warning apparatus of/for a vehicle" according to an embodiment of the present disclosure will be described with reference to the drawings. FIG. 1 illustrates the alert apparatus 10 according to the embodiment and a vehicle VA to which the alert apparatus 10 is applied.

As shown in FIG. 1, the alert apparatus 10 comprises an ECU 90. An "ECU" is an abbreviation of an Electronic Control Unit. The ECU 90 comprises a microcomputer as a main component. The microcomputer includes a CPU, a ROM, a RAM, a nonvolatile memory, and an interface I/F. The CPU achieves various functions through executing instructions/programs/routines stored in the ROM.

The vehicle 10 is equipped with a vehicle driving force generating device 11, a brake device 12, a steering device 13, a transmission actuator 14, and a transmission 15. The vehicle driving force generating device 11 is configured to generate a driving force to drive the vehicle VA. The driving force is transmitted to drive wheels of wheels of the vehicle VA via the transmission 15. The vehicle driving force generating device 11 is an internal combustion engine, but may be an electrical motor or both. The brake device 12 is configured to apply a brake force to decelerate the vehicle VA to the wheels of the vehicle VA. The steering device 13 is configured to apply a steering torque to steer the vehicle to steered wheels of the wheels of the vehicle VA. The transmission actuator 14 is connected to the transmission 15 and is configured to shift gears (change gear stage) of the transmission 15.

The ECU 90 is connected with the vehicle driving force generating device 11, the brake device 12, the steering device 13, and the transmission actuator 14. The ECU 90 is configured to control the vehicle driving force generating device 11 so as to control the driving force. The ECU 90 is configured to control the brake device 12 so as to control the brake force. The ECU 90 is configured to control the steering device 13 so as to control the steering torque.

The ECU 90 is configured to determine a gear stage (transmission speed) to be achieved, based on a shift position SP, an acceleration pedal operation amount, and a vehicle speed SPD that is a running speed of the vehicle 10. The ECU 90 is configured to transmit a drive signal to the transmission actuator 14 so as to realize the determined gear stage. For instance, when the shift position is at a reverse/backward range, the ECU 90 sets the gear stage to a reverse gear stage for letting the vehicle VA move backward. When the shift position is at a forward/driving range, the ECU 90 sets the gear stage to one of forward gear stages for letting the vehicle VA move forward. When the shift position is at a parking range, the ECU 90 sets the gear stage to a gear stage for preventing the vehicle VA from moving (or for keeping a parking state of the vehicle VA).

<Sensors>

The alert apparatus 10 comprises a steering angle sensor 22, a steering torque sensor 24, a vehicle speed sensor 26, a shift position sensor (shift range detection sensor) 27, a sonar sensor device 30, a camera sensor device 40, a display 50, and a speaker 60.

The steering angle sensor 22 is electrically connected to the ECU 90 and is configured to output a signal indicative of a rotation angle θst with respect to a neutral position of a steering wheel 16. The ECU 90 is configured to obtain the rotation angle θst as a steering angle θst based on the signal of the steering angle sensor 22. The steering angle θst is "0 (deg)" when the steering wheel 16 is at the neutral position, is a positive value when the steering wheel 16 is rotated counterclockwise (i.e., leftward or to a left rotation direction) from the neutral position, and is a negative value when the steering wheel 16 is rotated clockwise (i.e., rightward or to a right rotation direction) from the neutral position.

The steering torque sensor 24 is electrically connected to the ECU 90 and is configured to output a signal indicative of a torque TQst that is input to a steering shaft 17 by the driver. The ECU 90 is configured to obtain the torque TQst as a steering torque TQst based on the signal of the steering torque sensor 24.

The ECU 90 is configured to control the steering device 13 based on the obtained steering angle θst and the obtained steering torque TQst in such a manner that the steering torque determined based on the obtained steering angle θst and the obtained steering torque TQst is applied to the steered wheels of the wheels.

The vehicle speed sensor 26 is electrically connected to the ECU 90 and is configured to output a signal indicative of a rotational speed Vrot of each of the wheels of the vehicle VA. The ECU 90 is configured to obtain the rotational speed Vrot of each of the wheels based on the signal of the vehicle speed sensor 26, and to obtain a vehicle speed SPD based on the obtained rotational speed Vrot of each of the wheels. The thus obtained vehicle speed SPD is always positive regardless of whether the vehicle moves forward or backward.

The shift position sensor 27 is electrically connected to the ECU 90. The shift position sensor 27 is configured to output a signal indicative of a "shift position SP (i.e., shift range)" that is a position of an unillustrated shift lever operated by the driver. The shift position SP is at one of a forward range, a reverse range, a neutral range, and a parking range. The shift position sensor 27 is referred to as a shift range detection sensor and is configured to transmit the signal to the ECU 90.

Figure 2:
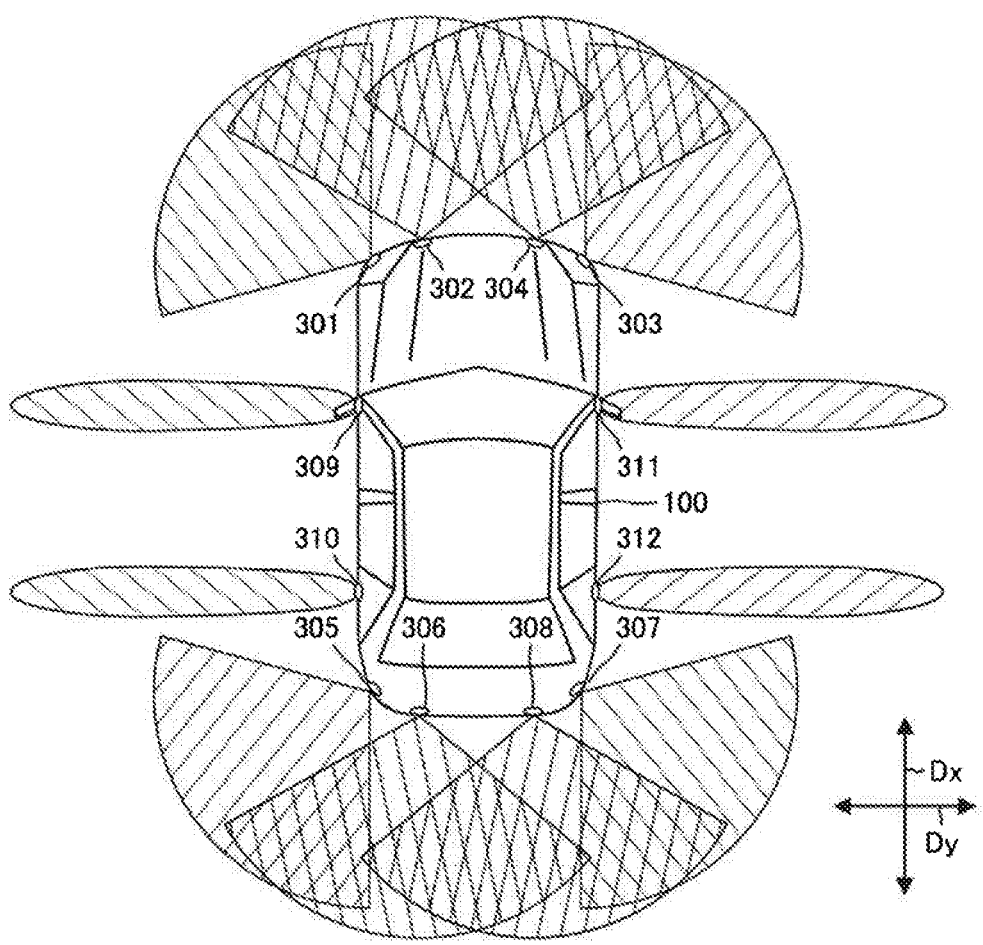
FIG. 2 is a plan view of the vehicle for illustrating positions of sonars of the sonar sensor device and their detection ranges.

The sonar sensor device 30 includes and is connected to a first to a twelfth clearance sonars 301 to 312, as shown in FIG. 2.

The first clearance sonar 301 is fixed to the vehicle VA so as to radiate ultrasonic wave along a front left direction from a front left end part of the vehicle VA.

The second clearance sonar 302 is fixed to the vehicle VA so as to radiate ultrasonic wave along a front direction from a front end on the left side of the vehicle VA.

The third clearance sonar 303 is fixed to the vehicle VA so as to radiate ultrasonic wave along a front right direction from a front right end part of the vehicle VA.

The fourth clearance sonar 304 is fixed to the vehicle VA so as to radiate ultrasonic wave along the front direction from the front end on the right side of the vehicle VA.

The fifth clearance sonar 305 is fixed to the vehicle VA so as to radiate ultrasonic wave along a rear left direction from a rear left end part of the vehicle VA.

The sixth clearance sonar 306 is fixed to the vehicle VA so as to radiate ultrasonic wave along a rear direction from a rear end on the left side of the vehicle VA.

The seventh clearance sonar 307 is fixed to the vehicle VA so as to radiate ultrasonic wave along a rear right direction from a rear right end part of the vehicle VA.

The eighth clearance sonar 308 is fixed to the vehicle VA so as to radiate ultrasonic wave along the rear direction from the rear end on the right side of the vehicle VA.

The ninth clearance sonar 309 is fixed to the vehicle VA so as to radiate ultrasonic wave along a left direction from a front left part of the vehicle VA.

The tenth clearance sonar 310 is fixed to the vehicle VA so as to radiate ultrasonic wave along the left direction from a rear left part of the vehicle VA.

The eleventh clearance sonar 311 is fixed to the vehicle VA so as to radiate ultrasonic wave along a right direction from a front right part of the vehicle VA.

The twelfth clearance sonar 312 is fixed to the vehicle VA so as to radiate ultrasonic wave along the right direction from a rear right part of the vehicle VA.

Each of the first to the twelfth clearance sonars 301 to 312 is configured to receive ultrasonic wave that is reflected from an object.

The sonar sensor device 30 is electrically connected to the ECU 90. The sonar sensor device 30 is configured to transmit, to the ECU 90, information (object information) including a "radiation time point at which each of the first to the twelfth clearance sonars 301 to 312 radiates the sonar wave" and a "reception time point at which each of the first to the twelfth clearance sonars 301 to 312 receives the reflected sonar wave". The ECU 90 is configured to obtain a distance between the object and each of the clearance sonars 301 to 312, based on the radiation time point and the reception time point of each of the clearance sonars 301 to 312, and to specify/obtain a distance between the object and a vehicle body of the vehicle VA and the position of the object with respect to the vehicle VA using the distances between the object and the clearance sonars 301 to 312.

In FIG. 2, the direction indicated by a reference Dx is a longitudinal (or front-rear) direction of the vehicle VA, and is referred to as a "vehicle longitudinal direction Dx", hereinafter. In FIG. 2, the direction indicated by a reference Dy is a lateral (or width) direction of the vehicle VA, and is referred to as a "vehicle width direction Dy", hereinafter.

Figure 3:
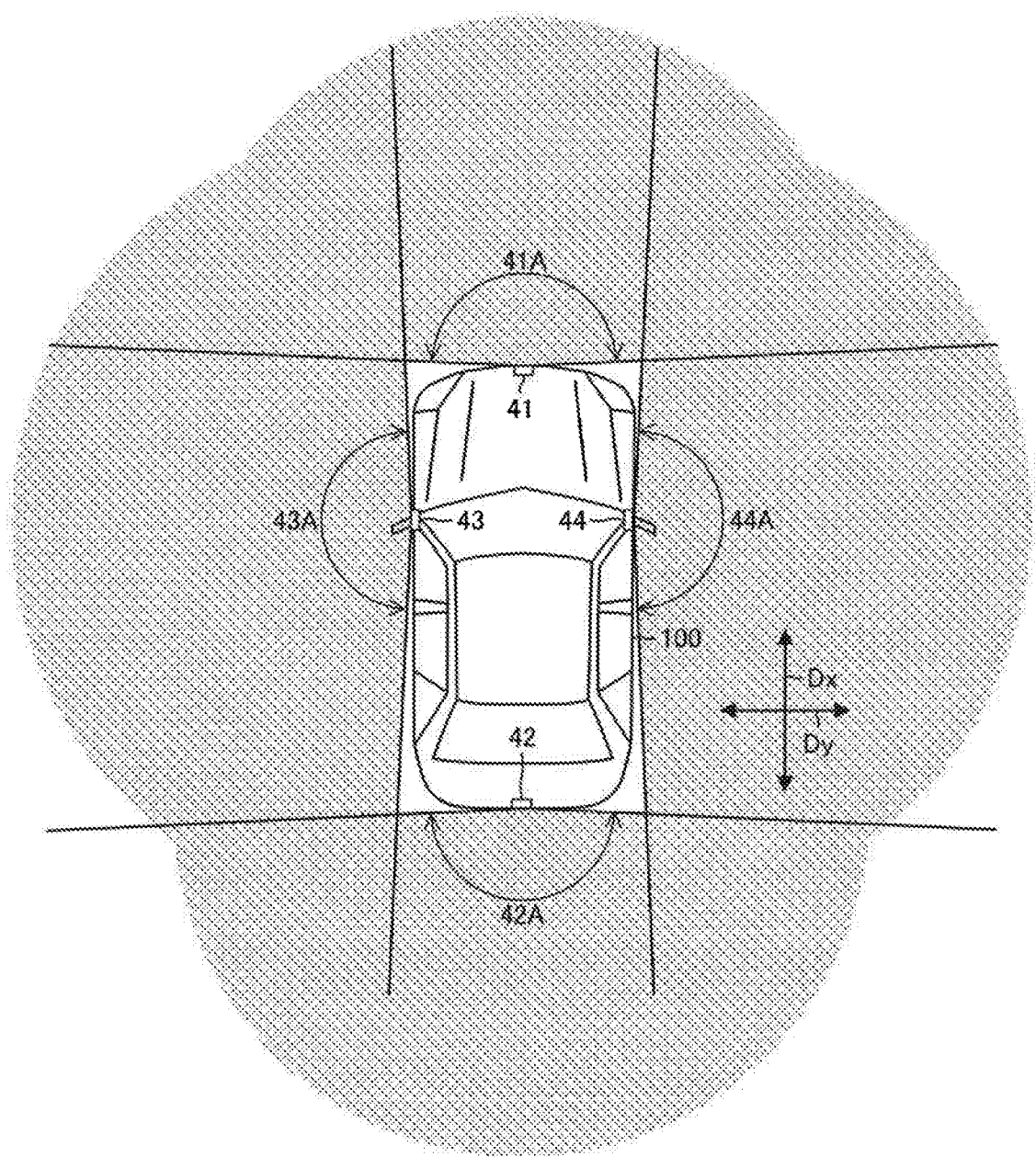
FIG. 3 is a plan view of the vehicle for illustrating positions of cameras of the camera sensor device and their image capturing ranges.

As shown in FIG. 3, the camera sensor device 40 comprises and is connected to a front camera 41, a rear camera 42, a left camera 43, and a right camera 44. Hereinafter, the front camera 41, the rear camera 42, the left camera 43, and the right camera 44 may sometimes be collectively referred to as "cameras 45", as appropriate.

The front camera 41 is fixed to a front end center part of the vehicle VA so as to photograph (or capture/take an image of) a scene in front of the vehicle VA. An angle 41A of view of the front camera 41 is about 180 degrees.

The rear camera 42 is fixed to a rear end center part of the vehicle VA so as to photograph (or capture/take an image of) a scene behind the vehicle VA. An angle 42A of view of the rear camera 42 is also about 180 degrees.

The left camera 43 is fixed to a left side part of the vehicle VA so as to photograph (or capture/take an image of) a scene on the left of the vehicle VA. An angle 43A of view of the left camera 43 is also about 180 degrees.

The right camera 44 is fixed to a right side part of the vehicle VA so as to photograph (or capture/take an image of) a scene on the right of the vehicle VA. An angle 44A of view of the right camera 44 is also about 180 degrees.

The camera sensor device 40 is electrically connected to the ECU 90. The ECU 90 is configured to obtain information (i.e., image data) on the images of the scenes taken by the cameras 45, from the camera sensor device 40.

Referring back to FIG. 1, the display 50 is arranged at a position of the vehicle VA so as to be seen by (or be visible to) the driver. In the present example, the display 50 is a display of a so-called navigation system.

Figure 5:
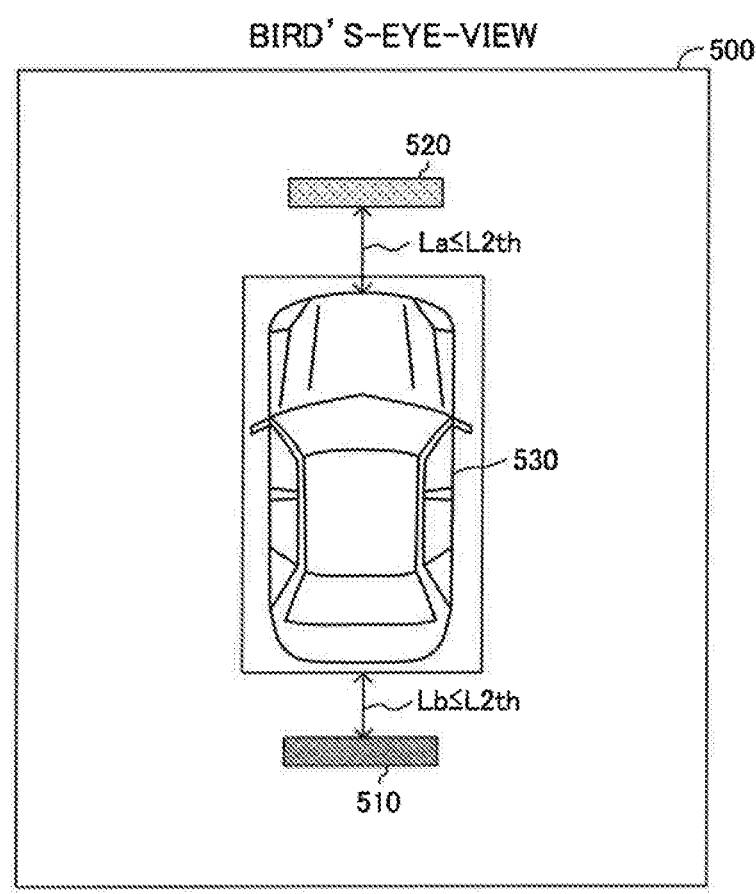
FIG. 5 is a bird's-eye-view displayed on the display.

The display 50 is electrically connected to the ECU 90. The ECU 90 is configured to let/have the display 50 display various images including a bird's-eye-view (a plane view) 500 shown in FIG. 5.

The speaker 60 is arranged inside a vehicle cabin of the vehicle VA and is configured to generate alert/warning sounds described later.

(Outline of Operation)

An outline of operation of the alert apparatus 10 will next be described with reference to FIGS. 4 to 7.

Figure 4:
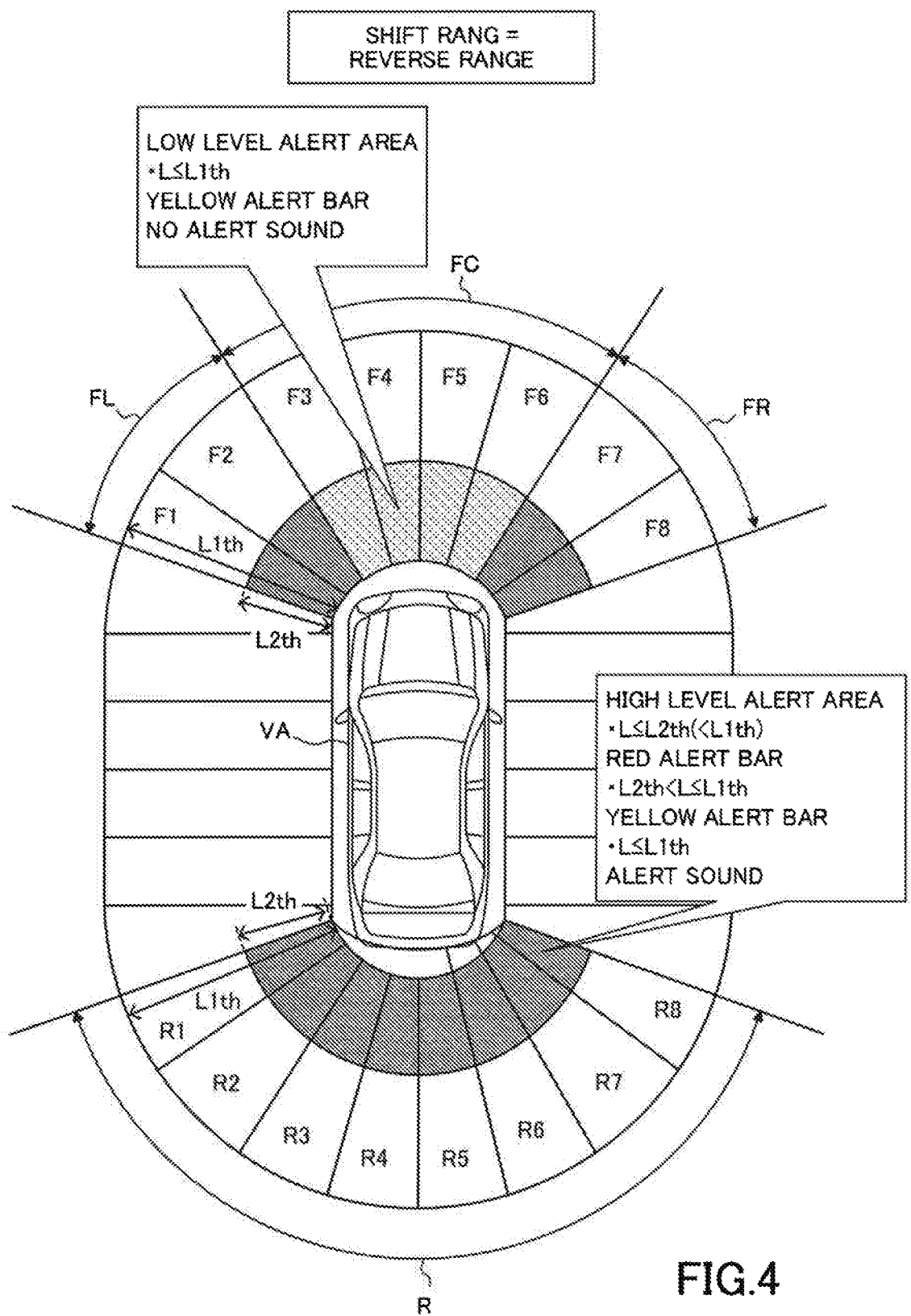
FIG. 4 is a plan view of the host vehicle for illustrating alert areas when the shift position is at the reverse range.

As shown in FIG. 4, according to the alert apparatus 10, a predetermined front area of the vehicle VA (i.e., an area in front of the vehicle VA) is divided into eight areas (sections) F1 to F8, each having a sector-like (fan-like) shape. The areas F1 to F8 have the same center angle as each other. Similarly, according to the alert apparatus 10, a predetermined rear area R of the vehicle VA (i.e., an area behind the vehicle VA) is divided into eight areas (sections) R1 to R8, each having a sector-like (fan-like) shape. The areas R1 to R8 have the same center angle as each other. Each of the areas F1 to F8 and R1 to R8 is sometimes referred to as a "predetermined area (or section/divided region)". A part including the areas F1 and F2 of the front area is sometimes referred to as a "front left area (section) FL". A part including the areas F3 to F6 of the front area is sometimes referred to as a "front center area (section) FC". A part including the areas F7 and F8 of the front area is sometimes referred to as a "front right area (section) FR".

An object that is present in one or more of the areas F1 to F8 is detected by the first to fourth clearance sonars 301-304.

An object that is present in one or more of the areas R1 to R8 is detected by the fifth to eighth clearance sonars 305-308.

The alert apparatus 10 is configured to set "one or more of areas (i.e., one or more of the front left area FL, the front center area FC, the front right area FR, and the rear area R) corresponding to the current shift position indicative of the current shift range (i.e., the range corresponding to the current shift position) among a plurality of the areas (i.e., the areas FL, FC, FR, and R)" to a "high level alert area". The alert apparatus 10 is configured to set each of the "areas (the rest of the areas) other than the area set to the high level alert area" to a "low level alert area".

<High Level Alert Area>

When an object is present in the high level alert area, the alert apparatus 10 determines whether or not an object distance L is equal to or shorter/smaller than a first distance threshold L1th, wherein the object distance L is a distance between the object and the vehicle (more specifically, a distance between the object and a periphery of a vehicle body of the vehicle VA). When the object distance L is (determined to be) longer/larger than the first distance threshold L1th, the alert apparatus 10 does not issue/generate an alert (to a driver of the vehicle VA). In contrast, when the object distance L is (determined to be) equal to or shorter/smaller than the first distance threshold L1th, the alert apparatus 10 issues/generates an alert (or warning) to the driver. The object with the object distance L equal to or shorter than the first distance threshold L1th is sometimes referred to as an "target alert object (or an object that should cause an alert to draw the driver's attention)".

The alert that the apparatus 10 generates/issues will be described. The alert apparatus 10 may generate two kinds of alerts that include a high level alert and a low level alert. The high level alert has a first alerting capability of drawing the driver's attention. The low level alert has a second alerting capability of drawing the driver's attention. As described below, the second alerting capability is lower than the first alerting capability. As the high level alert, the alert apparatus 10 displays, on the display 50, a red alert bar (red belt-like symbol) 510 at a position corresponding to the target alert object in the bird's-eye-view 500 shown in FIG. 5, and let the speaker 60 generate an alert sound. Whereas, as the low level alert, the alert apparatus 10 displays, on the display 50, a yellow alert bar (yellow belt-like symbol) 520 at a position corresponding to the target alert object in the bird's-eye-view 500 shown in FIG. 5, but does not let the speaker 60 generate an alert sound. Generally, red color calls greater attention to a human than yellow color. Thus, the red alert bar 510 calls greater attention to the driver than the yellow alert bar 520. In other words, an alerting capability (first capability) to draw the driver's attention of the red alert bar 510 is greater than an alerting capability (second capability) to draw the driver's attention of the yellow alert bar 520.

When the object distance L of the object present in the high level alert area is (determined to be) equal to or shorter than the first distance threshold L1th, the alert apparatus 10 further determines whether or not the object distance L is equal to or shorter/smaller than a second distance threshold L2th. The second distance threshold L2th is shorter/smaller than the first distance threshold L1th (i.e., L2th<L1th). When the object distance L of the object present in the high level alert area is (determined to be) equal to or shorter than the second distance threshold L2th, the alert apparatus 10 generates/issues the above-described high level alert. Whereas, when the object distance L of the object present in the high level alert area is (determined to be) longer than the second distance threshold L2th (and is equal to or shorter than the first distance threshold L1th), the alert apparatus 10 generates/issues the above-described low level alert.

<Low Level Alert Area>

When an object is present in the low level alert area, the alert apparatus 10 determines whether or not the object distance L is equal to or shorter/smaller than the first distance threshold L1th. When the object distance L of the object present in the low level alert area is (determined to be) equal to or shorter than the first distance threshold L1th, the alert apparatus 10 generates/issues the above-described low level alert. However, the alert apparatus 10 does not issue the above-described high level alert even when the object distance L of the object present in the low level alert area is (determined to be) equal to or shorter than the second distance threshold L2th (but rather continues the low level alert).

<Reverse/Backward Range>

When the shift position is at the reverse range, the alert apparatus 10 is configured to set each of "the front left area FL, the front right area FR, and the rear area R" to the high level alert area, and is configured to set "the front center area FC" to the low level alert area, as shown in FIG. 4.

Here, it is assumed that, when the shift position is at the reverse range, an object OBJa is present in the front center area FC which is now the low level alert area, and an object OBJb is present in the rear area R which is now the high level alert area. It is further assumed that the object distance La of the object OBJa is equal to or shorter than the second distance threshold L2th, and the object distance Lb of the object OBJb is equal to or shorter than the second distance threshold L2th. Under the above assumption, on the bird's-eye-view 500 shown in FIG. 5, the yellow alert bar 520 is displayed (or is superimposed) at a position corresponding to the object OBJa, and the red alert bar 510 is displayed (or is superimposed) at a position corresponding to the object OBJb. In addition, the alert sound is generated from the speaker 60, because an object (that is the object OBJb) is present in the high level alert area (in this case, the rear area R). It should be noted that the bird's-eye-view 500 is generated by cutting out three dimensional image data formed by synthesized image data obtained by synthesizing the image data from each of the cameras, and corresponds to a view of surroundings of the vehicle VA from a bird's-eye point that is immediately above the vehicle VA. An figure/icon representing the vehicle VA is placed at the center of the bird's-eye-view 500

<Forward/Driving and Neutral Range>

Figure 6:
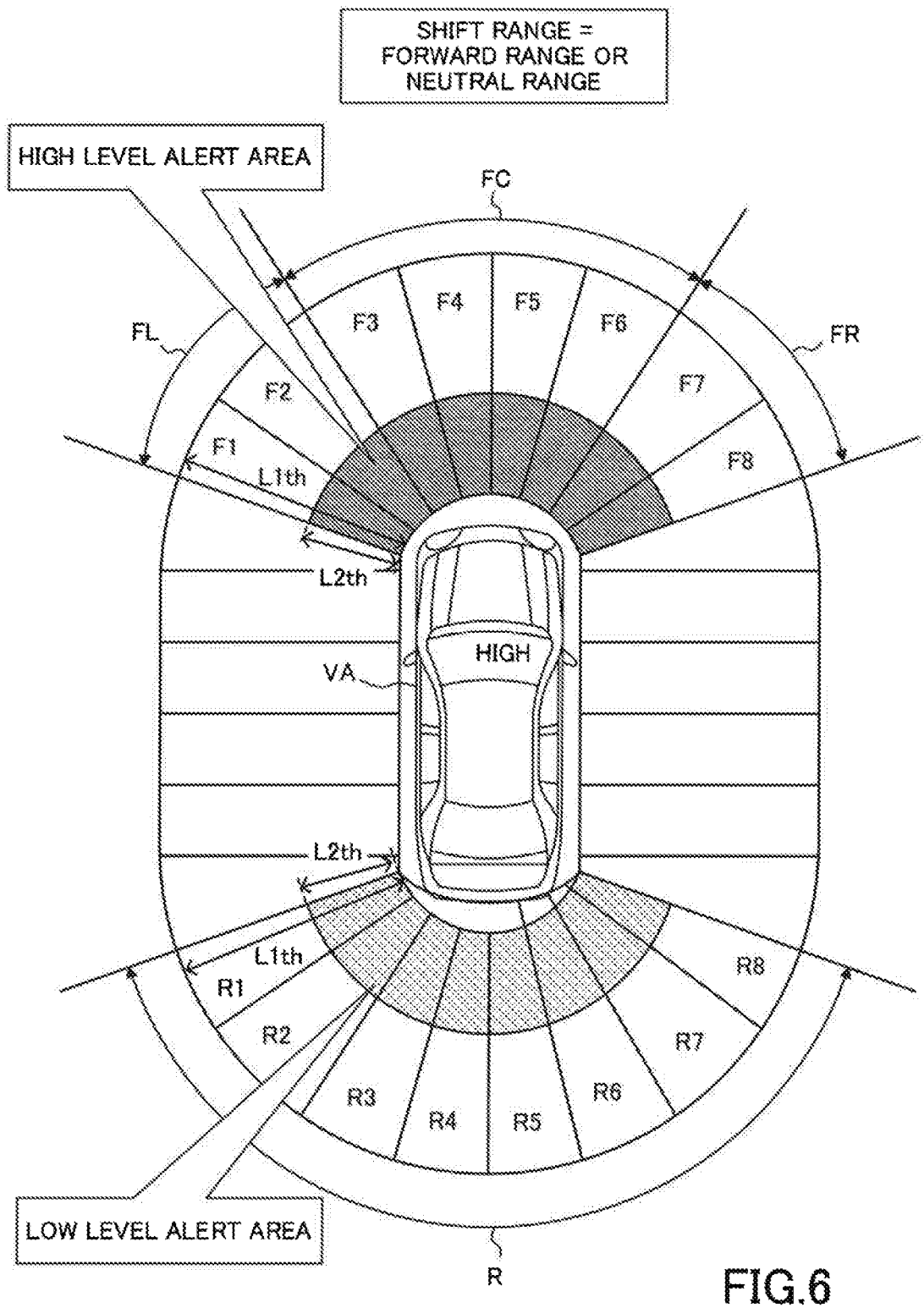
FIG. 6 is a plan view of the host vehicle for illustrating alert areas when the shift position is at the forward range or the neutral range.

When the shift position is at the forward range or the neutral range, the alert apparatus 10 is configured to set each of "the front left area FL, the front center area FC, and the front right area FR" to the high level alert area, and is configured to set "the rear area R" to the low level alert area, as shown in FIG. 6.

It is now further assumed that the shift position is switched from the reverse range to the forward range in the case where the object OBJa is present in the front center area FC and the object OBJb is present in the rear area R (as the above-described assumption where the both of the object distances of them are shorter than the second distance threshold L2th). In this case, since the front center area FC where the object OBJa is present is set/switched from the low level alert area to the high level alert area, the red alert bar 510 starts to be displayed (or is superimposed) in place of the yellow alert bar 520 at the position corresponding to the object OBJa. Simultaneously, since the rear area R where the object OBJb is present is set/switched from the high level alert area to the low level alert area, the yellow alert bar 520 starts to be displayed (or is superimposed) in place of the red alert bar 510 at the position corresponding to the object OBJb.

In this manner, the "red alert bar that has been displayed at the position corresponding to the object OBJb in the case where the shift position has been at the reverse range" does not totally disappear but is switched to the yellow alert bar at the same position as the position of that red alert bar, when the shift position is switched from the reverse range to the forward range. Accordingly, a possibility of causing the driver to feel the feeling of strangeness due to the sudden disappearance of the alert bar can be decreased.

<Parking Range>

Figure 7:
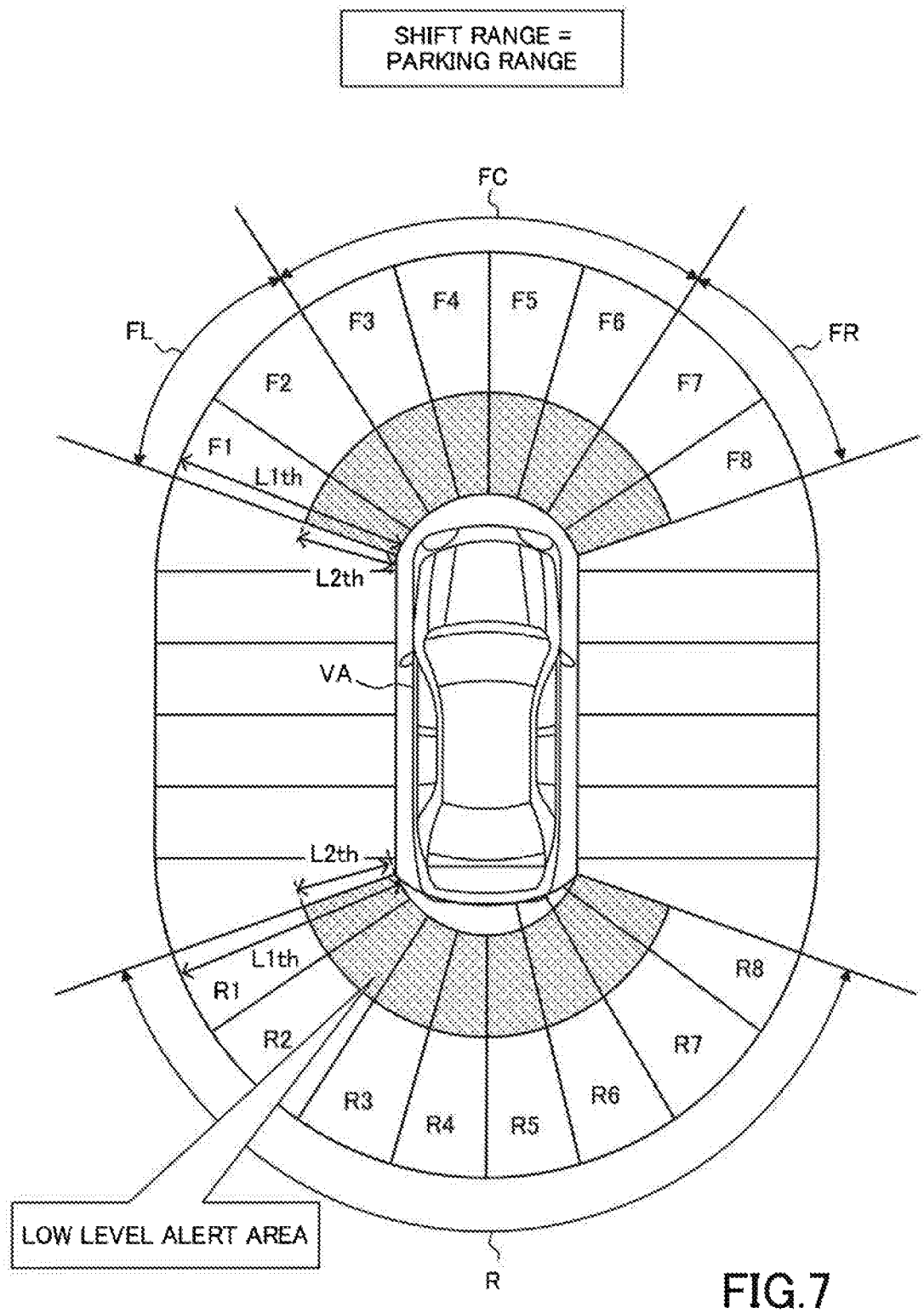
FIG. 7 is a plan view of the host vehicle for illustrating alert areas when the shift position is at the parking range.

When the shift position is at the parking range, the alert apparatus 10 is configured to set each and all of "the front left area FL, the front center area FC, the front right area FR, and the rear area R" to the low level alert area, as shown in FIG. 7. Thus, in this case, no area is set to the high level alert area. In this manner, when the shift position is at the parking range, all of the areas (FL, FC, FR, and R) are set to the low level alert area. Therefore, when the shift position is switched to the parking range from the range other than the parking range, the alert bar that has been displayed until the shift position change time point does not suddenly disappear.

As described above, the alert apparatus 10 sets each one or more of the areas (surrounding areas of the vehicle) to the high level alert area based on the shift range, and sets each of the rest of the areas to the low level alert area. In other words, the alert apparatus 10 stores in advance, as the high level areas, the areas that correspond to the shift range. Accordingly, when the target alert object whose object distance L is equal to or shorter than the second distance threshold L2th is positioned/present in the high level alert area, the alert apparatus 10 can display the red alert bar 510 that has a high capability (first capability) of drawing the driver's attention and generate the alert sound. In addition, the areas other than the areas that have been set to the high level areas is set to the low level areas. This can prevent the alert bar that has been displayed until the shift position is switched from suddenly disappearing. Accordingly, the alert apparatus 10 can reduce the possibility of causing the driver to feel strange feelings.

(Specific Operation)

Figure 8:
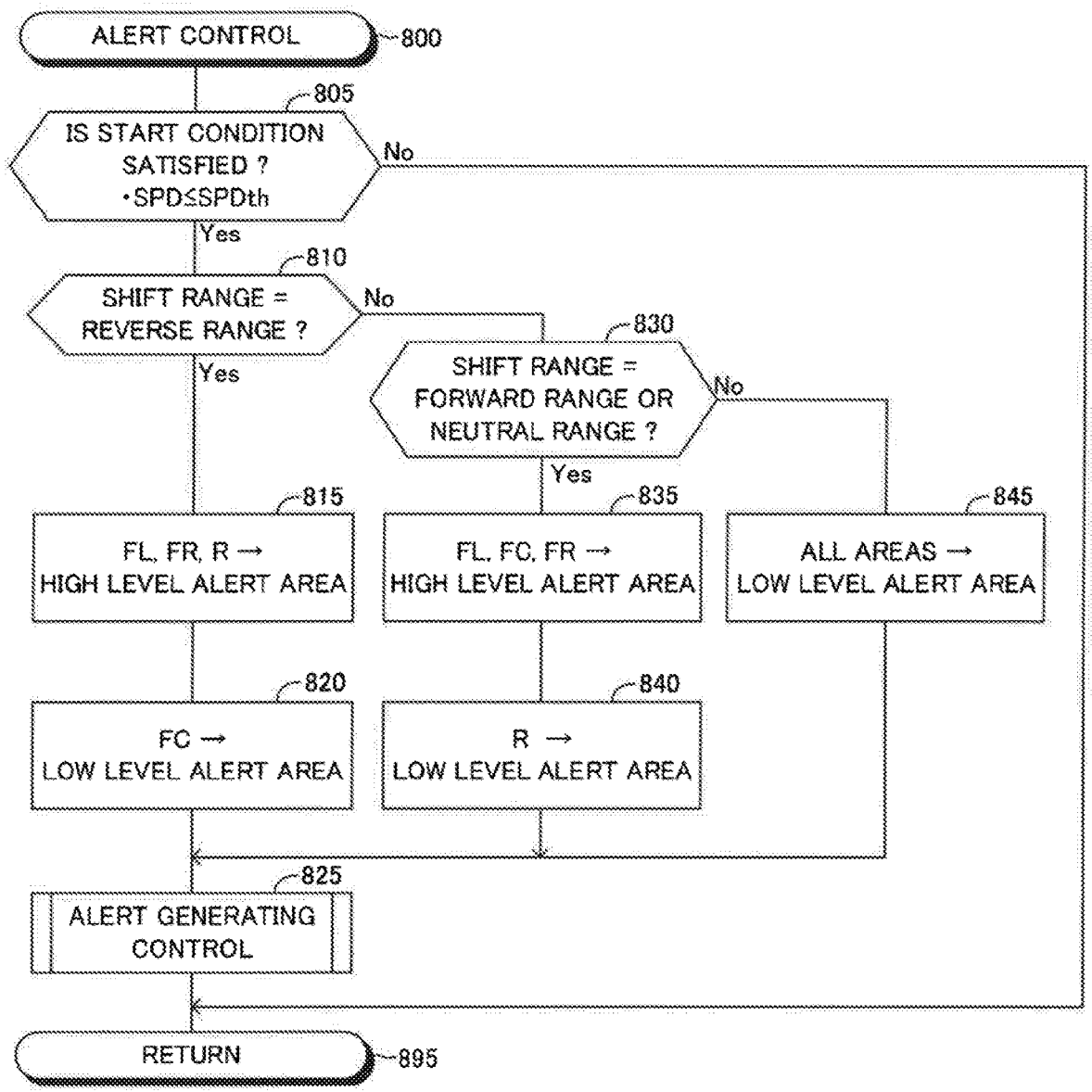
FIG. 8 is a flowchart showing a routine executed by the CPU of the ECU shown in FIG. 1.

The CPU of the ECU 90 is configured to execute a routine (an alert control routine) shown by a flowchart in FIG. 8 every time a predetermined time elapses. Hereinafter, the CPU means the CPU of the ECU 90, unless otherwise noted.

When an appropriate time point comes, the CPU starts processing from step 800 shown in FIG. 8, and proceeds to step 805 so as to determine whether or not the vehicle speed SPD is equal to or lower than a speed threshold SPDth. When the vehicle speed SPD is equal to or lower than the speed threshold SPDth, the CPU determines that a start condition is satisfied.

If the start condition is satisfied, the CPU makes a "Yes" determination at step 805, and proceeds to step 810 so as to determine whether or not the shift position is at the reverse range (i.e. whether or not a current shift range is the reverse range).

When the shift position is at the reverse range, the CPU makes a "Yes" determination at step 810, and executes processes of step 815 to step 825 described below in this order. Thereafter, the CPU proceeds to step 895 so as to end the present routine tentatively.

Step 815: the CPU sets each of the front left area FL, the front right area FR, and the rear area R to the high level alert area.

Step 820: the CPU sets the front center area FC (i.e., the rest of the areas among the areas FL, FC, FR, and R) to the low level alert area.

Step 825: the CPU performs an alert generating control described later.

If the shift position is not at the reverse range when the CPU proceeds to step 810, the CPU makes a "No" determination at step 810, and proceeds to step 830. At step 830, the CPU determines whether or not the shift position is at any one of the forward range and the neutral range.

When the shift position is at any one of the forward range and the neutral range, the CPU makes a "Yes" determination at step 830, and executes processes of step 835 and step 840 described below in this order. Thereafter, the CPU proceeds to step 825.

Step 835: the CPU sets each of the front left area FL, the front center area FC, and the front right area FR to the high level alert area.

Step 840: the CPU sets the rear area R (the rest of the areas among the areas FL, FC, FR, and R) to the low level alert area.

Whereas, if the shift position is neither at the forward range nor at the neutral range (namely, if the shift position is at the parking range), the CPU makes a "No" determination at step 830, and proceeds to step 845. At step 845, the CPU sets each of the front left area FL, the front center area FC, the front right area FR, and the rear area R to the low level alert area. Thereafter, the CPU proceeds to step 825.

Furthermore, if the start condition is not satisfied when the CPU proceeds to step 805, the CPU makes a "No" determination at step 805, and proceeds to step 895 so as to end the present routine tentatively.

<Alert Generating Control>

Figure 9:
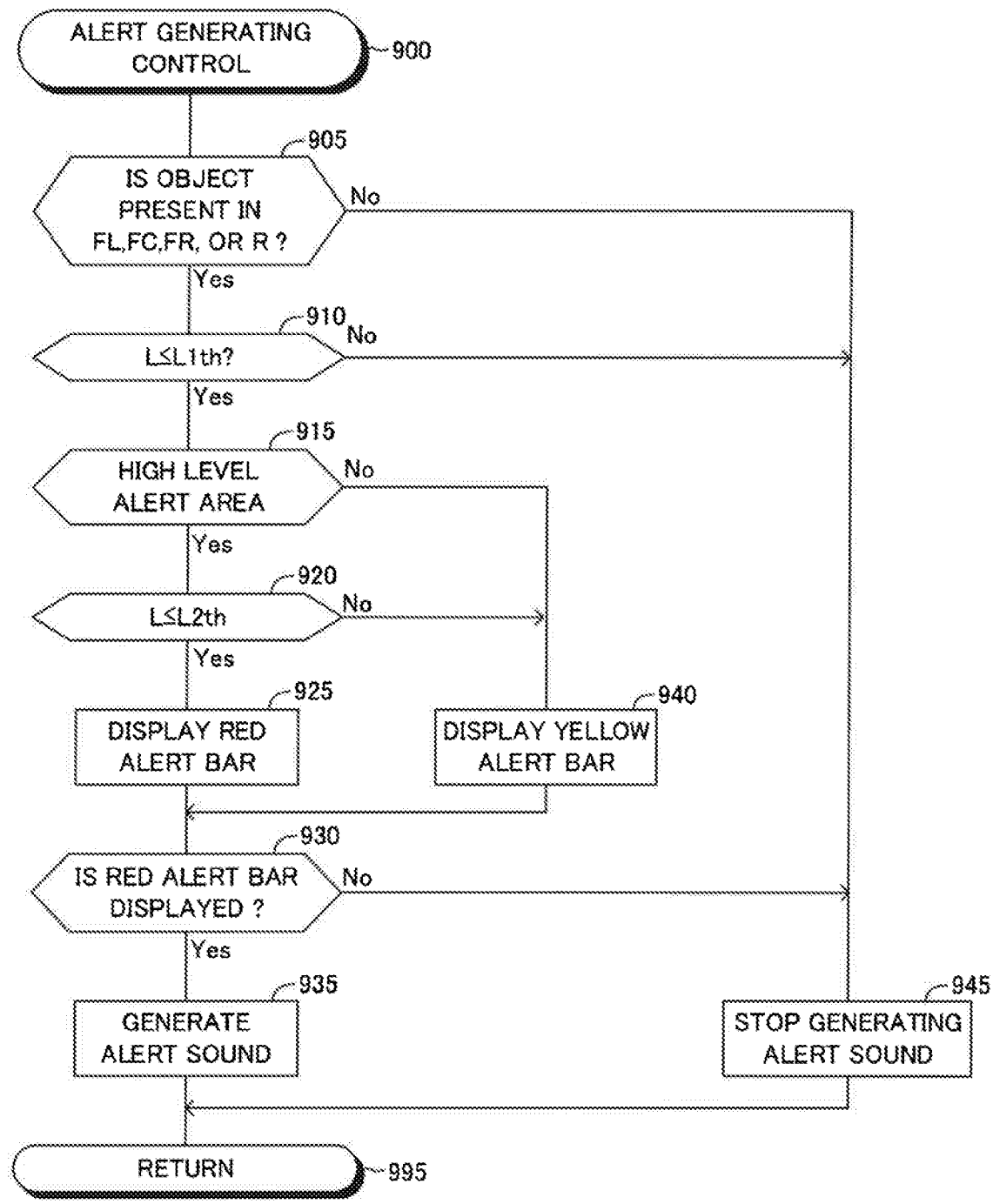
FIG. 9 is a flowchart showing a routine executed by the CPU to execute a step for an alert generating control shown in FIG. 8.

When the CPU proceeds to step 825, the CPU starts processing from step 900 of a subroutine shown by a flowchart in FIG. 9, and proceeds to step 905. At step 905, the CPU determines whether or not an object detected by the sonar sensor device 30 is present in any of the front left area FL, the front center area FC, the front right area FR, and the rear area R. It should be noted that the CPU obtains/specifies a position of the detected object based on each of distances, each being a distance between the object and the clearance sonar that has detected the object, and obtains the object distance L based on the position of the detected object and the position of the clearance sonar that has detected the object, as described above.

When an object is determined to be present in any of the areas FL, FC, FR, and R, the CPU makes a "Yes" determination at step 905, and proceeds to step 910. At step 910, the CPU determines whether or not the object distance L of that object is equal to or shorter/smaller than the first distance threshold L1th. In other words, the CPU determines whether or not that object is the target alert object.

When the object distance L of that object is equal to or shorter/smaller than the first distance threshold L1th, the CPU makes a "Yes" determination at step 910, and proceeds to step 915. At step 915, the CPU determines whether or not an area in which that object is present is the high level alert area.

When the area in which that object is present is the high level alert area, the CPU makes a "Yes" determination at step 915, and proceeds to step 920. At step 920, the CPU determines whether or not the object distance L of that object is equal to or shorter/smaller than the second distance threshold L2th.

When the object distance L of that object is equal to or shorter/smaller than the second distance threshold L2th, the CPU makes a "Yes" determination at step 920, and proceeds to step 925. At step 925, the CPU displays the red alert bar 510 at a position corresponding to the position of that object in the bird's-eye-view 500, and proceeds to step 930.

At step 930, the CPU determines whether or not the red alert bar 510 is being displayed. In other words, the CPU determines whether or not there is at least one object that is present in the high level alert area and has the object distance L equal to or shorter/smaller than the second distance threshold L2th.

When the red alert bar 510 is being displayed, the CPU makes a "Yes" determination at step 930, and proceeds to step 935. At step 935, the CPU lets the speaker 60 generate the alert sound, and proceeds to step 995 so as to end the present routine (and return to step 895 shown in FIG. 8).

Whereas, if the object distance L of the object that is present in the high level alert area is longer/larger than the second distance threshold L2th, the CPU makes a "No" determination at step 920, and proceeds to step 940. In this case, since the "Yes" determination has been made at step 910, the object distance L of that object is equal to or shorter/smaller than the first distance threshold L1th. At step 940, the CPU displays the yellow alert bar 520 at a position corresponding to the position of that object in the bird's-eye-view 500, and proceeds to step 930.

If the red alert bar 510 is not being displayed when the CPU proceeds to step 930, the CPU makes a "No" determination at step 930, and proceeds to step 945. At step 945, the CPU stops letting the speaker 60 generate the alert sound if the alert sound has been generated. Thereafter, the CPU proceeds to step 995 so as to end the present routine (and return to step 895 shown in FIG. 8).

Whereas, when the CPU proceeds to step 915, the CPU makes a "No" determination at step 915 if the area in which the object is present is not the high level alert area (i.e., if the area is the low level alert area), and proceeds to step 940.

Furthermore, when the CPU proceeds to step 910, the CPU makes a "No" determination at step 910 if the object distance L is longer/larger than the first distance threshold L1th, and proceeds to step 945.

In addition, when the CPU proceeds to step 905, the CPU makes a "No" determination at step 905 if no object is present in any of the front left area FL, the front center area FC, the front right area FR, and the rear area R, or if any of the clearance sonars of the sonar sensor device 30 does not detect any object, and proceeds to step 945.

Modified Examples

In one of modified examples of the present disclosure, an area/areas that is/are set to (assigned to, classified into) the high level alert area(s) is/are different between when the steering wheel is rotated counterclockwise (i.e., in the left rotation direction) with respect to the neutral position and when the steering wheel is rotated clockwise (i.e., in the right rotation direction) with respect to the neutral position, in a case where the shift position is at the reverse range.

Figure 10:
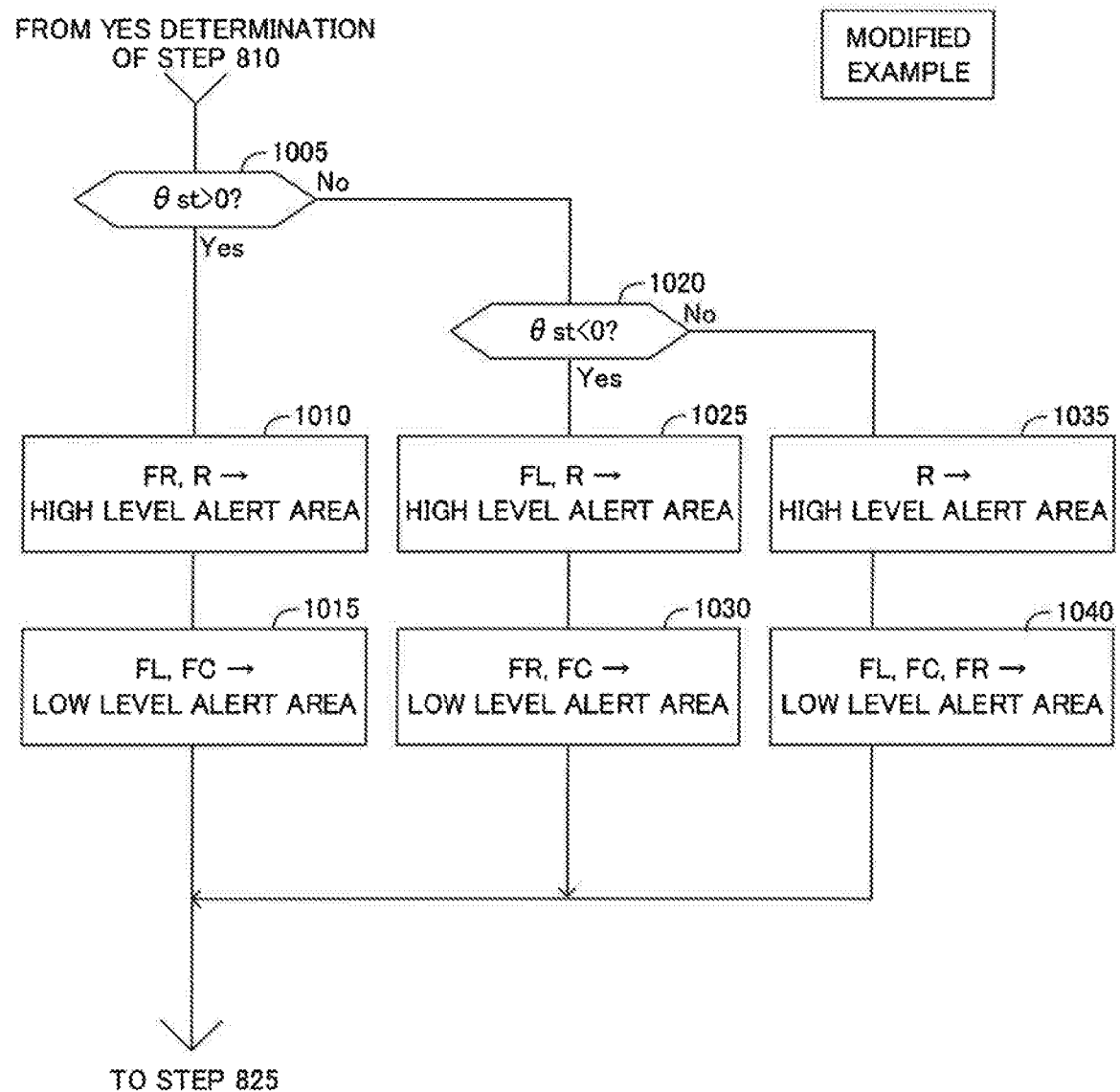
FIG. 10 is a flowchart showing a routine executed by a CPU of the ECU according to a modified embodiment of the present disclosure.

The CPU of the above modified example proceeds to step 1005 shown in FIG. 10, when the CPU makes a "Yes" determination at step 810 shown in FIG. 8 (namely, when the shift position is at the reverse range).

At step 1005, the CPU determines whether or not the steering angle θst detected by the steering angle sensor 22 is positive. Namely, the CPU determines whether or not the steering wheel 16 is rotated counterclockwise with respect to the neutral position.

When the steering angle θst is positive, the CPU makes a "Yes" determination at step 1005, and executes processes of step 1010 and step 1015 described below in this order. Thereafter, the CPU proceeds to step 825 shown in FIG. 8.

Step 1010: the CPU sets each of the front right area FR and the rear area R to the high level alert area.

Step 1015: the CPU sets each of the front left area FL and the front center area FC (i.e., the rest of the areas among the areas FL, FC, FR, and R) to the low level alert area.

When the steering angle θst is positive (i.e., when the steeling wheel 16 is rotated counterclockwise from the neutral position) while the shift position is at the reverse range, the vehicle VA moves backward in such a manner that a curve trajectory of the front right corner of the vehicle VA becomes larger. Therefore, in this case, the front right corner of the vehicle VA has a relatively high possibility of colliding/contacting with an object, whereas, the front left corner of the vehicle VA has a relatively low possibility of colliding/contacting with an object. This is why the front right area FR is set to the high level alert area, and the front left area FL is set to the low level alert area.

Whereas, when the CPU proceeds to step 1005, the CPU makes a "No" determination at step 1005 if the steering angle θst is not positive (i.e., if the steering angle θst is zero or negative), and proceeds to step 1020. At step 1020, the CPU determines whether or not the steering angle θst is negative. Namely, the CPU determines whether or not the steering wheel 16 is rotated clockwise respect to the neutral position.

When the steering angle θst is negative, the CPU makes a "Yes" determination at step 1020, and executes processes of step 1025 and step 1030 described below in this order. Thereafter, the CPU proceeds to step 825 shown in FIG. 8.

Step 1025: the CPU sets each of the front left area FL and the rear area R to the high level alert area.

Step 1030: the CPU sets each of the front right area FR and the front center area FC (i.e., the rest of the areas among the areas FL, FC, FR, and R) to the low level alert area.

When the steering angle θst is negative (i.e., when the steering wheel 16 is rotated clockwise with respect to the neutral position) while the shift position is at the reverse range, the vehicle VA moves backward in such a manner that a curve trajectory of the front left corner of the vehicle VA becomes larger. Therefore, in this case, the front left corner of the vehicle VA has a relatively high possibility of colliding/contacting with an object. This is why the front left area FL is set to the high level alert area, and the front right area FR is set to the low level alert area.

In contrast, when the CPU proceeds to step 1020, the CPU makes a "No" determination at step 1020 if the steering angle θst is not negative (i.e., when the steeling angle θst is zero), and executes processes of step 1035 and step 1040 described below in this order. Thereafter, the CPU proceeds to step 825 shown in FIG. 8.

Step 1035: the CPU sets the rear area R to the high level alert area.

Step 1040: the CPU sets each of the front left area FL, the front center area FC, and the front right area FR (i.e., the rest of the areas among the areas FL, FC, FR, and R) to the low level alert area.

When the steering angle θst is zero ("0"), that is when the steering wheel 16 is at the neutral position), the vehicle VA moves straight backward (from the current position) without turning. Therefore, in this case, the front left corner and the front right corner of the vehicle VA has a relatively low possibility of colliding/contacting with an object. This is why the front left area FL and the front right area FR are both set to the low level alert areas.

It should be noted that the CPU may be configured to set each of the front left area FL, the front right area FR, and the rear area R to the high level alert area, at step 1035, and the CPU may be configured to set the front center area FC to the low level alert area at step 1040.

The present disclosure is not limited to the above embodiments, and may employ various modifications within the scope of the present disclosure.

For instance, the alert apparatus 10 is configured to display the red alert bar 510 and the yellow alert bar 520, however, each of those bars may have any kind of shapes/figures, such as an elliptical shape, an oval shape, and a trapezoid shape.

In addition, colors (i.e., a red color and a yellow color) are used to differentiate the alert level (between the high level alert and the low level alert), however, shapes may be used to differentiate the alert level. For example, the bar having a rectangular shape corresponds to the high level alert and the bar having an elliptical shape corresponds to the low level alert.

The clearance sonars 301 to 312 may be replaced with any types of sensors, as long as each of them is configured to radiate a radio wave (e.g., an infrared ray, and radar wave) and to receive a reflected radio wave so as to detect an object. Namely, the clearance sonars 301 to 312 may be replaced with the infrared ray radar sensors and/or millimeter wave band radar sensors. Alternatively, the infrared ray radar sensors and/or millimeter wave band radar sensors may be employed in addition to the clearance sonars 301 to 312.

The number of the cameras 45 and the number of the clearance sonars 301 to 312 are not limited those figures described in FIGS. 2 and 3.

What is claimed is:

1. An alert apparatus of a vehicle comprising:
   an object detection sensor configured to detect an object and to obtain information on a position of said object, said information including an object distance that is a distance of said object from said vehicle;
   a shift range detection sensor configured to detect a current shift range; and
   a control unit configured to generate an alert to a driver of said vehicle when said object detected by said object detection sensor is a target alert object that is an object that is present in one of predetermined areas around said vehicle and that has said object distance equal to or shorter than a first distance threshold,
   wherein,
   said control unit is configured to:
      set one or more of said predetermined areas to a high level alert area based on said detected current shift range, and set each of the rest of said predetermined areas to a low level alert area;
      determine whether or not said object distance of said target alert object is equal to or shorter than a second distance threshold that is shorter than said first distance threshold when said target alert object is positioned in said set high level alert area;
      generate a high level alert having a first alerting capability of drawing said driver's attention, when it is determined that said object distance of said target alert object positioned in said set high level alert area is equal to or shorter than said second distance threshold;
      generate a low level alert having a second alerting capability of drawing said driver's attention, said second alerting capability being lower than said first alerting capability, when it is determined that said object distance of said target alert object positioned in said set high level alert area is longer than said second distance threshold; and
      generate said low level alert when said target alert object is positioned in said set low level alert area, regardless of whether or not said object distance of said target alert object positioned in said set low level alert area is equal to or shorter than said second distance threshold.

2. The alert apparatus of a vehicle according to claim 1, wherein, said predetermined areas include a front center area of said vehicle and a rear area of said vehicle, and wherein,
   said control unit is configured to:
      set said front center area to said high level alert area and set said rear area to said low level alert area, when said current shift range is a forward range; and
      set said rear area to said high level alert area and set said front center area to said low level alert area, when said current shift range is a reverse range.

3. The alert apparatus of a vehicle according to claim 2, wherein, said predetermined areas further include, in addition to said front center area and said rear area, a front left area that is an area on the left of said front center area and a front right area that is an area on the right of said front center area,
   and wherein,
   said control unit is configured to:
      set not only said front center area but also each of said front left area and said front right area to said high level alert area and set said rear area to said low level alert area, when said current shift range is said forward range; and
      set not only said rear area but also each of said front left area and said front right area to said high level alert area and set said front center area to said low level alert area, when said current shift range is said reverse range.

4. The alert apparatus of a vehicle according to claim 2, further comprising a steering angle sensor configured to detect a steering angle of said vehicle,
   wherein, said predetermined areas further include, in addition to said front center area and said rear area, a front left area that is an area on the left of said front center area and a front right area that is an area on the right of said front center area,
   and wherein,
   said control unit is configured to:
      set not only said front center area but also each of said front left area and said front right area to said high level alert area and set said rear area to said low level alert area, when said current shift range is said forward range;
      set not only said rear area but also said front right area to said high level alert area and set not only said front center area but also said front left area to said low level alert area, when said current shift range is said reverse range and said detected steering angle indicates that a steering wheel has been rotated counterclockwise with respect to a neutral position of said steering wheel; and
      set not only said rear area but also said front left area to said high level alert area and set not only said front center area but also said front right area to said low level alert area, when said current shift range is said reverse range and said detected steering angle indicates that said steering wheel has been rotated clockwise with respect to said neutral position of said steering wheel.

* * * * *